United States Patent [19]

Collien et al.

[11] Patent Number: 6,087,030

[45] Date of Patent: *Jul. 11, 2000

[54] ELECTROCHEMICAL CELL ANODE AND HIGH DISCHARGE RATE ELECTROCHEMICAL CELL EMPLOYING SAME

[75] Inventors: Randall L. Collien, Madison; Patrick J. Spellman, Middleton; Robert B. Dopp, Madison; John Edward Oltman, Mount Horeb, all of Wis.; John David Burns, Newton Hall Estate, United Kingdom; Joseph Lynn Passaniti, Fitchburg; Michael Joseph Root, Verona, both of Wis.

[73] Assignee: Rayovac Corporation, Madison, Wis.

[*] Notice: This patent is subject to a terminal disclaimer.

[21] Appl. No.: 09/028,294

[22] Filed: Feb. 24, 1998

Related U.S. Application Data

[63] Continuation-in-part of application No. 08/543,327, Oct. 16, 1995, Pat. No. 5,721,065, which is a continuation-in-part of application No. 08/435,477, May 5, 1995, Pat. No. 5,733,716, which is a continuation-in-part of application No. 08/435,770, May 5, 1995, abandoned, which is a continuation-in-part of application No. 08/435,485, May 5, 1995, Pat. No. 5,582,930, which is a continuation-in-part of application No. 08/435,185, May 5, 1995, Pat. No. 5,591,541, which is a continuation-in-part of application No. 08/435,195, May 5, 1995, Pat. No. 5,582,932, which is a continuation-in-part of application No. 08/435,179, May 5, 1995, Pat. No. 5,567,538.

[51] Int. Cl.[7] .................................................. H01M 4/42
[52] U.S. Cl. .............................. 429/29; 429/212; 429/229
[58] Field of Search ............................... 429/29, 212, 229, 429/230

[56] References Cited

U.S. PATENT DOCUMENTS

| | | |
|---|---|---|
| 4,084,047 | 4/1978 | Himy et al. .......................... 429/229 X |
| 4,288,913 | 9/1981 | Parsen et al. ........................... 29/623.5 |
| 4,332,870 | 6/1982 | Parsen et al. ........................... 429/206 |
| 4,380,578 | 4/1983 | Bahary ................................... 429/206 |

(List continued on next page.)

FOREIGN PATENT DOCUMENTS

| | | |
|---|---|---|
| 22496/83 | 6/1984 | Australia . |
| 560579 | 9/1993 | European Pat. Off. . |

OTHER PUBLICATIONS

Morse, E.M., Zinc–Oxygen Battery System, 19th Annual Power Sources Conferences, May 18–20, 1965, p. 109–112.
Arregui, J.; Shimotake, H., Universal Application of the Zinc–air System in Batteries, Progress in Batteries and Solar Cells, vol. 5, 1984, p. 136–138 (Month unknown).

(List continued on next page.)

*Primary Examiner*—Stephen Kalafut
*Attorney, Agent, or Firm*—Thomas D. Wilhelm; Jerry F. Janssen

[57] ABSTRACT

This invention pertains to novel alkaline electrochemical cells having high drain capacities, especially cells having high drain rate capabilities at voltages of at least 1.1 volts for use in small appliances such as hearing aids. The anode includes anode material in the cells including potassium hydroxide, zinc powder, 0.02% to 0.5% of a reaction rate enabling compound selected from a compound of indiumcadmium, gallium, thallium, germanium, tin, or lead, with indium compounds being preferred. The anode material optionally further includes a low level of mercury, and preferably a surfactant comprising hydroxyethylcellulose. The cathode provides sufficient oxidative capability to oxidize the zinc at a sufficient rate to support the electrical drain demands on the cell. A cathode, in a preferred zinc air cell for a hearing aid, includes at least 5 air ports, evenly distributed over the surface of the bottom of the cathode can. Cells of the invention exhibit prolonged operation at relatively constant voltage over 1.1 volts, and relatively constant power output at a power density of at least about 210 milliwatts per square inch of the reaction surface area of the cathode assembly, for periods significantly longer than conventional cells of the same type.

68 Claims, 10 Drawing Sheets

U.S. PATENT DOCUMENTS

| | | | |
|---|---|---|---|
| 4,435,488 | 3/1984 | Bahary et al. | 429/212 |
| 4,455,358 | 6/1984 | Graham et al. | 429/190 |
| 4,579,791 | 4/1986 | Wang | 429/50 |
| 4,585,710 | 4/1986 | McEvoy | 429/27 |
| 4,585,716 | 4/1986 | Chalilpoyil et al. | 429/206 |
| 4,608,325 | 8/1986 | Ismail | 429/217 |
| 4,681,698 | 7/1987 | Graham et al. | 252/182.1 |
| 4,722,763 | 2/1988 | Pa et al. | 156/616.1 |
| 4,777,100 | 10/1988 | Chalilpoyil et al. | 429/59 |
| 4,840,644 | 6/1989 | Chalilpoyil et al. | 29/623.1 |
| 4,861,688 | 8/1989 | Miura et al. | 429/230 X |
| 5,721,065 | 2/1998 | Collien et al. | 429/29 |
| 5,773,176 | 6/1998 | Serenyi . | |

OTHER PUBLICATIONS

Nonomura, Eiichi, Recent Directions in Hearing Aids, Japan Acoustics Society Magazine, vol. 45, #7. (Jul. 1989).

Hajime Konishi, Takjashi Yokoyama: Zinc–air Batteries for Pagers, National Technical Report, vol. 37, No. 1, Feb. 1991, p. 38–43.

Sieminski, Dennis, Recent Advances in Rechargeable Zinc–air Battery Technology, The Twelfth Annual Battery Conference on Applications and Advances, 1997, p. 171–180. (Month unknown).-

ELECTROCHEMICAL CELL ANODE AND HIGH DISCHARGE RATE ELECTROCHEMICAL CELL EMPLOYING SAME

CROSS-REFERENCE TO RELATED APPLICATIONS

This application is a continuation-in-part application of application Ser. No. 08/543,327 filed Oct. 16, 1995, now U.S. Pat. No. 5,721,065 which, in turn, is a continuation-in-part of applications Ser. Nos. 08/435,477 now U.S. Pat. No. 5,733,716; 08/435,770 now abandoned; and 08/435,485; 08/435,185; 08/435,195; and 08/435,179, all filed May 5, 1995, now respectively U.S. Pat. Nos. 5,582,930, 5,591,541, 5,582,932, and 5,567,538; all such applications being herein incorporated by reference in their entireties.

FIELD OF THE INVENTION

This invention relates to alkaline electrochemical cells. Typical such cells have an anode containing zinc, and a cathode providing ions for oxidation of the zinc. The more efficient such electrochemical cells now use ambient air, diffused into the cathode from the surrounding environment, to provide cathodic oxidation ions to oxidize the zinc, thereby enhancing the space available to contain anode material in the cell.

Recent advances in alkaline cell technology, disclosed in the above referenced patent applications, address efficient utilization of the space available for use within the appliance in which the cell is used. Recent advances further address efficient distribution of cathodic oxygen to the cathode assembly, in combination with improved control of evaporative losses of moisture through the cathode.

BACKGROUND OF THE INVENTION

The growth in use of small electrically-powered devices has increased the demand for very small electrochemical cells. Metal-air cells have gained significant popularity because only the anode reaction material need be packaged in the cell, while the cathode reaction material is oxygen, which is drawn from the surrounding environment.

Such small electrochemical cells are usually disc-like or pellet-like in appearance, and are about the size of garment buttons. These cells generally have diameters ranging from less than 6.4 millimeters to about 25 millimeters, and height ranging from less than 3.8 millimeters up to about 15 millimeters.

The small size and the limited amount of electrochemically reactive material which can be contained in such small metal-air cells result in considerable attention being directed to improving the efficiency and completeness of the electrochemical reactions which are used in such cells for generating electrical energy.

In addition, such small cells have limited rate capacity for generating electrochemical output, especially over sustained periods of use. However, technical advances in the appliances which use such electrochemical cells are placing increasing demands on the cells. These increasing demands include demands for increased rate of output of electrochemical power.

Especially with respect to cells used in newer hearing aids, a voltage of about 1.1 volts is required for dependable operation of the hearing aid. As the voltage drops below 1.1 volts, the hearing aid may operate improperly, thereby frustrating the user, or may not operate at all.

The limit on the rate at which an electrochemical cell can produce electrochemical power, under heavy demand situations, is determined in part by (i) the rate at which electrical energy generated in the cell can be transmitted to and through respective electrical conductors and thus to the using appliance, and in part by (ii) the rate at which the electrical energy can be generated by electrochemical reactions within the cell.

It is an object of this invention to provide novel compositions of matter for use within the anode portion of the electrochemical cell.

It is another object to provide novel anodes, including novel anode material compositions, for use within the anode portions of the electrochemical cell.

It is yet another object to provide novel electrochemical cells wherein air ports in the cathode can provide a balance between (i) the need for cathodic air to support the electrochemical reaction against (ii) the need to control moisture loss through evaporation.

Still another object is to provide novel anode material compositions, and corresponding cathode structures, which enable longer sustained periods of power production at a relatively steady voltage of at least 1.1 volts, under heavy drain.

A further object is to provide novel anode material compositions, and corresponding cathode structures, which enable longer sustained periods of power production at a relatively steady voltage of at least 1.1 volts while protecting the electrochemically reactive anode metal from corrosion in the alkaline environment.

SUMMARY OF THE INVENTION

The invention generally comprehends novel anode material compositions, using indium ion in the anode material, as a component provided separate from the zinc metal powder, preferably in combination with low levels of mercury associated with the zinc, and optionally in combination with an hydroxyethylcellulose surfactant, also associated with the zinc.

Indium is included, in the form of an indium compound, generally in amounts of about 0.02% to about 0.5% by weight, based on the weight of the zinc. Surfactant is generally included in amounts of about 0.1% to about 0.4% by weight, also based on the weight of the zinc. Mercury may be from about 0.2% to about 12% by weight, but generally comprises about 2% to about 3.5% by weight, based on the weight of the zinc.

The zinc need not contain indium as an alloy therewith, and is generally free from functionally detectable amounts of indium. However, the zinc may contain limited amounts of indium in its alloy without jeopardizing the operation of the invention. Preferably, a low level of lead, such as about 0.02% to about 0.1%, preferably about 0.05%, by weight lead, is also associated with the zinc.

Accordingly, some of the objects of the invention are obtained in embodiments comprehending a composition of matter including potassium hydroxide and zinc, and comprising about 27% to about 45% by weight potassium hydroxide; about 55% to about 73% by weight zinc powder; about 0.02% to about 0.5% by weight indium in the form of indium compound; and about 0.2% to about 12%, preferably about 1% to about 4%, more preferably about 2% to about 3.5%, mercury.

The composition preferably includes about 0.1% to about 0.4%, preferably about 0.3% to about 0.35%, by weight, based on the weight of the zinc powder, of the organic surfactant.

Preferably, the surfactant is mixed with the zinc powder before adding the indium compound to the zinc.

In preferred embodiments, the composition of the zinc powder, as incorporated into the composition, comprises less than 0.01% by weight indium, and can be substantially free from functionally detectable amounts of indium.

The zinc powder is particulate, with particle size averaging about 100 microns to about 500 microns.

Preferred compositions comprise about 30% to about 35% by weight potassium hydroxide, about 65% to about 70% by weight zinc powder, and about 0.05% to about 0.15% by weight, preferably about 0.05% to about 0.10% by weight of the indium.

The indium compound preferably comprises at least one compound selected from the group consisting of indium hydroxide, indium sulfate, and indium chloride.

Additional objects are attained in embodiments comprehending an anode for use in an electrochemical cell, wherein electrochemically active anode material used therein comprises the above compositions of matter, generally including potassium hydroxide, zinc, indium compound, and the other above-recited components.

Further objects of the invention are attained in a method of making an anode material, and respectively an anode, having the above described compositions of matter, for use in an electrochemical cell. The method comprises the steps of mixing with the zinc powder about 0.1% to about 0.4% by weight of the organic surfactant; after the above step, the step of mixing, with the combination of zinc powder and surfactant, the indium compound; and after the above steps, adding the potassium hydroxide to the zinc powder mixture.

Still other objects are attained in embodiments comprehending an electrochemical cell made with an above described anode and a respective cathode, preferably an air cathode, including a reaction surface area on the air cathode. The cathode can comprises a plurality of air ports to admit oxygen to the cathode and cathode assembly, and thus to the reaction surface area. Such electrochemical cells of the invention typically have electrochemical capacity to deliver at least about 212 milliwatts of power per square inch of the reaction surface area at emf of at least about 1.1 volts at continuous drain under a load of 51 ohms, for a period corresponding to a period of at least about 5 hours, preferably at least about 8 hours, for a respective such electrochemical cell wherein the contained volume, inside the outer walls of the cell, is about 0.04 cubic inch.

The cathode assembly preferably has an electrochemically active reaction surface area facing the bottom of the cathode can. The bottom of the cathode can preferably comprises at least 5 air ports, more preferably at least 6 air ports, in any event having a combined open area of at least about 0.00047 square inch and desirably no more than about 0.00189 square inch, with a most preferred combined open area of about 0.001 square inch. The air ports are preferably substantially evenly spaced about the bottom of the cathode can with respect to the reaction surface area of the cathode assembly.

Preferred electrochemical cells of the invention have electrochemical capacity to deliver at least 1.1 volts for a period of at least about 8 hours, preferably at least about 15 hours, when subjected to sequential loads of 37 ohms for 1 second, followed by 370 ohms for 1 second, repeated continuously.

Preferred cells also have electrochemical capacity to deliver at least 1.1 volts for a drain period of at least about 20 hours when subjected to sequential loads of 43 ohms for 1 second, followed by 100 ohms for 59 seconds, the above sequence being repeated for 12 hours, followed by a 12 hour rest period, then the drain sequence and rest periods being repeated until the voltage drops below 1.1 volts.

Figure 1:
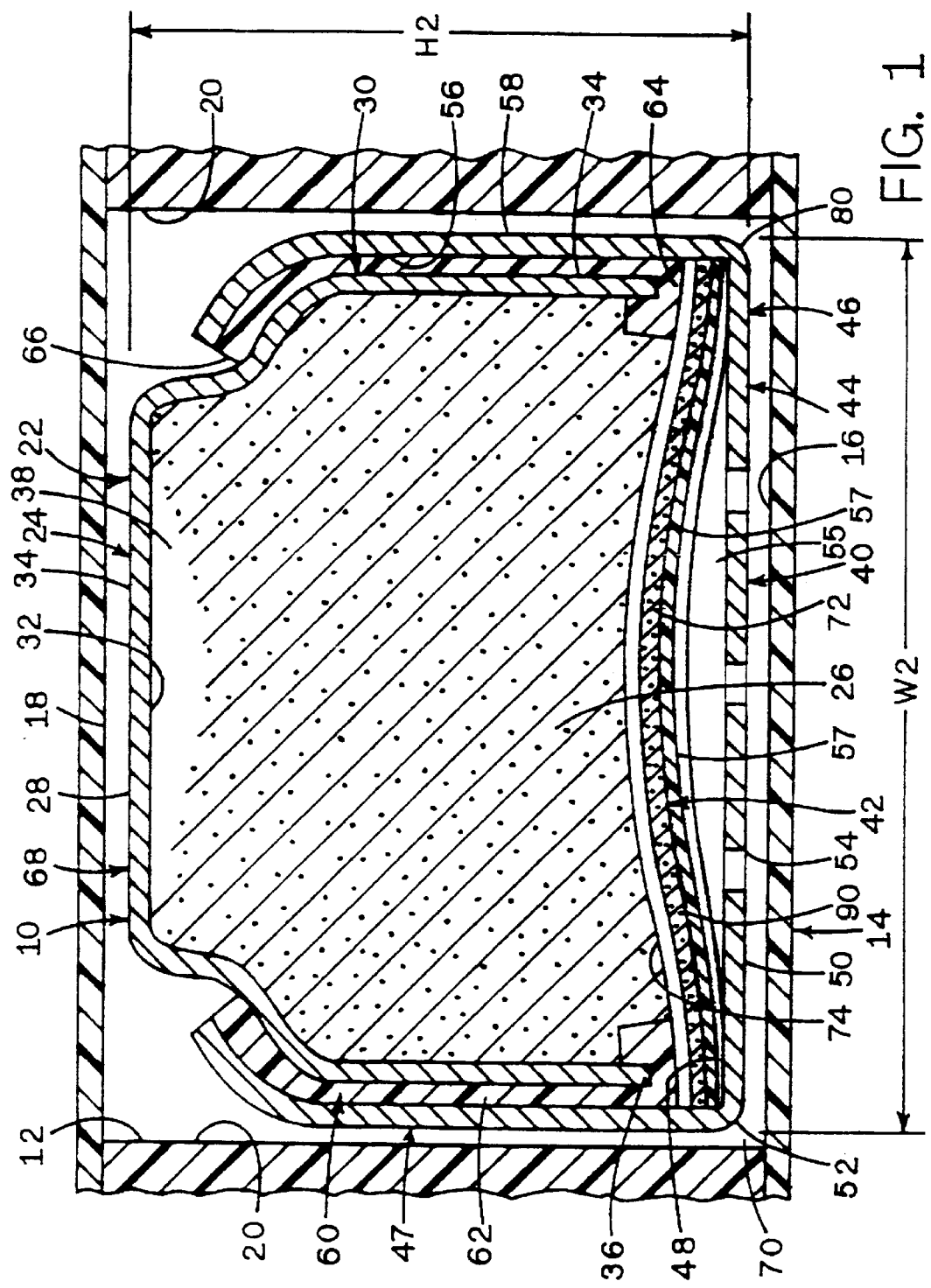
FIG. 1 shows a cross-section of a preferred zinc-air electrochemical cell of the invention.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Figure 2:
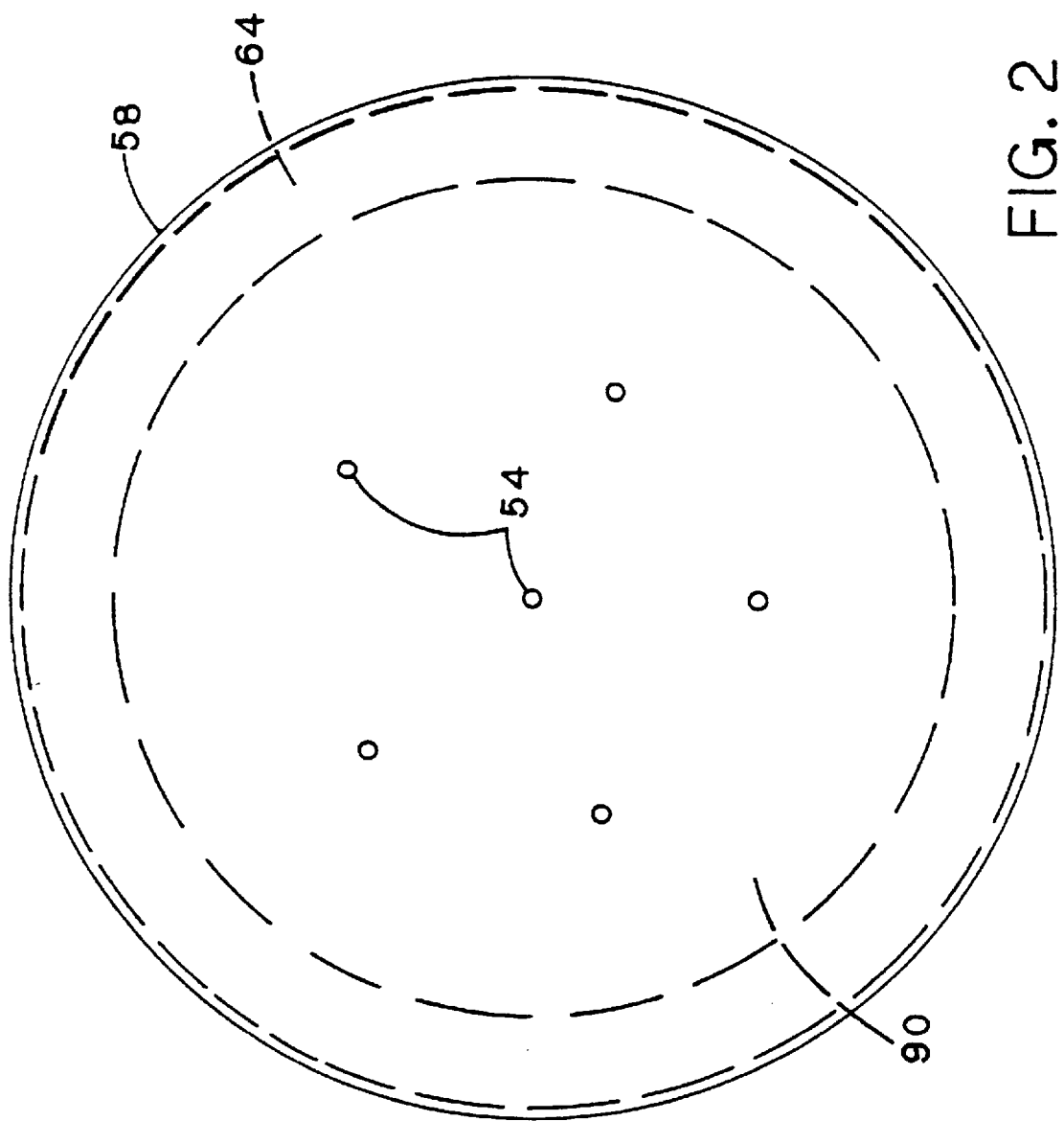
FIG. 2 shows a bottom view of the cell of FIG. 1.

Referring by characters of reference to the drawings, FIGS. 1 and 2 illustrate use of electrochemical cells of the invention in an appliance 14 wherein the cell 10 is disposed inside the space 12 allocated for occupation by the cell. As illustrated in FIG. 1, the space 12 is generally bounded by a bottom wall 16 of the appliance, a top wall 18 of the appliance, and side walls 20.

Referring specifically to the cell 10, the negative electrode, also referred to as the anode 22, includes an anode can 24 and electrochemically reactive anode material 26 contained therein. The anode can 24 has a top wall 28, and circumferential downwardly-depending side wall 30. Top wall 28 and side wall 30 have, in combination, an inner surface 32 and an outer surface 34. Side walls 30 terminate in a circumferential can foot 36. The top wall 28 and side walls 30 generally define a cavity 38 within the anode can, which cavity contains the anode material 26.

The positive electrode, also referred to as the cathode 40, includes a cathode assembly 42, contained within the cathode can 44. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can, providing avenues for traverse of oxygen through the bottom 46 into the cathode 40 adjacent cathode assembly 42. An air reservoir 55 spaces the cathode assembly 42 from bottom 46 and the corresponding air ports 54. A porous diffusion layer 57 fills the air reservoir 55. Side wall 47 of the cathode can has an inner surface 56 and an outer surface 58.

The anode 22 is electrically insulated from the cathode 40 by a seal 60. Seal 60 includes a circumferential side wall 62 disposed between the upstanding side wall 47 of the cathode can and the downwardly-depending side wall 30 of the anode can. A seal foot 64 is disposed generally between the can foot 36 of the anode can and the cathode assembly 42. A seal top 66 is positioned at the locus where the side wall 62 of seal 60 extends from between the side walls 30 and 47 adjacent the top of the cell.

The outer surface 68 of the cell 10 is thus defined by portions of the outer surface 34 of the top of the anode can, outer surface 58 of the side wall 47 of the cathode can, outer surface 50 of the bottom of the cathode can, and the top 66 of the seal 60.

In general, the anode material 26 includes about 27% by weight to about 45% by weight potassium hydroxide, about 55% to about 73% by weight zinc powder, and sufficient amount of indium to enable increased rate of electrochemical output of at least the anode portion of the electrochemical cell. A preferred amount of indium in the indium compound is about 0.02% to about 0.5% by weight, based on the weight of the zinc powder. The anode material preferably also includes about 0.2% to about 12% by weight mercury, and about 0.1% to about 0.4% by weight of an organic surfactant comprising hydroxyethylcellulose, the percentages of the mercury and the organic surfactant being based on the weight of the zinc. The anode material generally also contains about 0.1% to about 0.5% by weight, based on the weight of the zinc, of a gelling agent, and zinc oxide in amount of about 1% to about 4%, preferably about 2%, based on the weight of the potassium hydroxide.

The anode mix is prepared as follows. A dry solid powdered coating composition comprising equal amounts of organic surfactant, gelling agent, and MgO is added to a desired amount of zinc powder, in amount of about 3% by weight coating composition to about 97% by weight zinc powder, and mixed in a coating and mixing step to form a first dry-coated mixture of zinc powder and the coating composition. At that point, especially the organic surfactant and the gelling agent are coated on the surfaces of the particles of the zinc powder, but have not yet, in general, been activated.

The dry coated zinc mixture is then mixed, 2 parts fresh uncoated zinc powder with 1 part of the coated zinc powder mixture to form a second mixture of coated zinc powder with uncoated zinc powder, whereby each component of the coating is then present at a concentration of about 0.33% by weight of the second mixture.

Indium compound is then added to, and mixed with, the second mixture in the desired amount, such as about 0.02% to about 0.5% by weight indium in the indium compound, based on the weight of the second mixture, to make a third dry mixture including the indium compound. The third dry mixture includes (i) zinc coated with surfactant, gelling agent, and MgO, (ii) the zinc added after the coating and mixing step, and (iii) indium compound.

The third dry mixture is placed into the anode can 24, preferably in amount to provide about 67% by weight of the finished anode material 26.

Potassium hydroxide is prepared for use in the anode by adding to a quantity of potassium hydroxide preferably about 2% by weight ZnO. The resulting potassium hydroxide has a consistency resembling that of water. No other additives need generally be used to prepare the potassium hydroxide for use in making the anode material 26.

The so prepared potassium hydroxide is added to the third dry mixture in the anode can, in amount to provide about 33% of the weight of the finished anode material 26. The liquid potassium hydroxide then begins coacting with the gelling agent, thus converting the anode material to the form of a gel, in situ.

The cathode can, containing the cathode assembly, is then superimposed over the so-formed anode, and the cathode can is closed about the anode can, thus forming and sealing the electrochemical cell.

Any of the conventionally known gelling agents may be used in any conventionally known amounts. Preferred gelling agent composition is carboxypolymethylene, available from B.F. Goodrich Company, Cleveland, Ohio, under the trade name CARBOPOL®. Preferred amount of the CARBOPOL® gelling agent is about 3% by weight, based on the weight of the zinc powder.

When surfactant is present in the alkaline electrolyte together with the zinc, it is believed to be chemically adsorbed on the surface of the zinc through the metal soap principle to form a hydrophobic monomolecular layer which provides a corrosion-inhibiting effect at the zinc surface, while at the same time making the zinc sufficiently available for the electrochemical oxidation reaction that the desired rate of production of electrochemical power can be maintained under heavy cell loading.

A suitable surfactant is available from Aqualon company, Wilmington, Del., as "Natrosol®." The Natrosol® surfactant is an hydroxyethylcellulose. While choosing not to be bound by technical theory, applicants believe that the hydroxyethylcellulose surfactant is at least in part enabling of the greater rates of power generated by the anode, and thus the increased electrochemical output from the cell.

In the preferred methods of making the anode material 26, the indium compound is added to the mixture after the organic surfactant is mixed with the zinc powder.

The preferred indium compound for use herein is indium hydroxide. Methods of making suitable indium hydroxide are disclosed in U.S. Pat. No. 5,168,018 Yoshizawa, herein incorporated by reference in its entirety.

When indium hydroxide powder is mixed with the zinc powder, the indium hydroxide powder may coat the zinc particles. When the potassium hydroxide is added to the zinc powder, part of indium hydroxide may be electrodeposited onto the surface of the zinc through the principle of substitution plating, thereby raising the hydrogen overvoltage on the respective surfaces of the zinc particles. Any remaining portion of the indium hydroxide which is not so electrodeposited may be retained as it is in a solid form in the alkaline electrolyte. This "remaining portion" of indium hydroxide, if any, may be electrodeposited onto fresh surface of zinc exposed when the zinc is subjected to discharging, whereby the "remaining portion" of the indium can deposit on newly formed surface area of the zinc particles to thereby protect such newly formed surface areas.

The smaller the particle size of the indium compound, the better the dispersion in the alkaline electrolyte, so that the indium can be effective uniformly throughout the anode. If the indium compound particle is too small, then it may be immediately dissolved whereby the amount of the indium available to be used after partial discharging may be insufficient.

Figure 3:
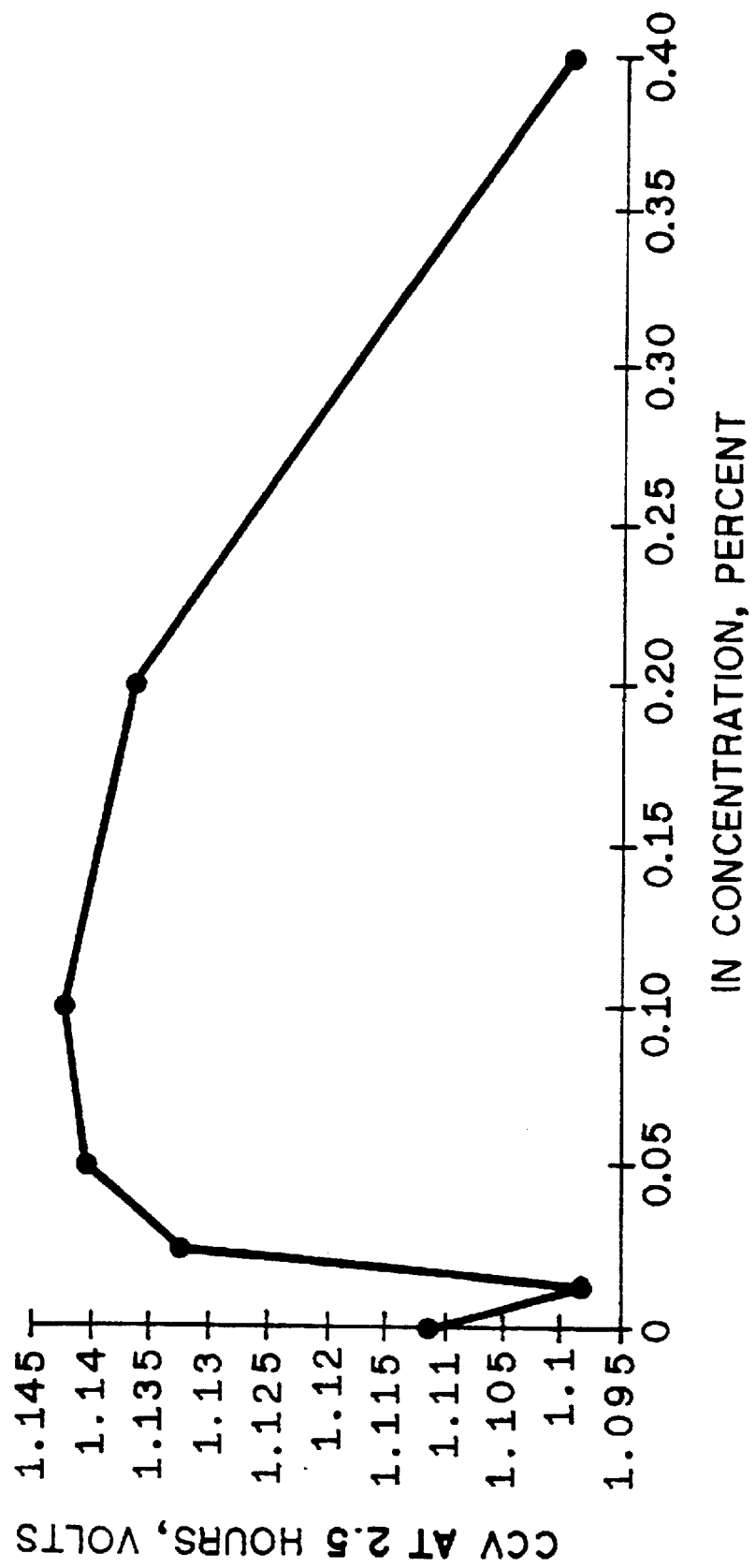
FIG. 3 shows a graph of closed circuit voltage of electrochemical cells of the invention with respect to indium loading, under continuous drain conditions.

FIG. 3 illustrates the performance of electrochemical cells of the invention, expressed in volts as a function of the amount of indium compound in the anode. In developing the data used to make up FIG. 3, cells of size PR44 according to the International Electrochemical Commission (IEC), generally having width "W2" of about 0.45 inch and height "H2" of about 0.21 inch, were produced according to the above preparation procedure, with varying amounts of indium hydroxide as the indium compound. The "third" dry mixture of primarily zinc powder represented 67% by weight of the anode material, while the potassium hydroxide and ZnO, in combination, represented 33% by weight of the anode material.

In the zinc mixture, equal amounts of Natrosol® hydroxyethylcellulose organic surfactant, CARBOPOL® 934 gelling agent, and MgO were mixed together to form a "first" mixture, then mixed with the zinc to form a "second" coated zinc mixture, and the second coated zinc mixture mixed 1 part coated zinc mixture to 2 parts uncoated zinc powder, to form a "third" zinc mixture having overall 0.33% by weight of each of the 3 additives—surfactant, gelling agent, and MgO. The zinc contained 0.05% by weight lead, and 3% by weight mercury.

Cells made as above were first aged for 1 month, then tested for continuous drain at a continuous load of 51 ohms. Referring to FIG. 3, closed cell voltage was recorded at about 2.5 hours from the start of the test, which represented a time when the cells had reached peak power production, and were producing at a fairly steady rate with respect to both voltage and power.

FIG. 3 illustrates that use of indium compound results in increased voltage over at least a range of about 0.02% to about 0.40% by weight indium, based on the weight of the zinc, whereby inclusion of the indium compound provides increased voltage at high drain, over cells having lesser or greater amounts of indium compound. Peak improvement resulting from inclusion of the indium occurs over a range of about 0.03% to about 0.20% indium.

The potassium hydroxide need not have any additives, only the ZnO as indicated above. Use of ZnO is well known, so is not discussed further here.

The amount of potassium hydroxide can vary from a low of about 27% by weight of the anode material 26 to a high of about 45%. The balance of the anode material is made up primarily of the zinc powder, making allowance for the noted additives. Preferred concentration for the potassium hydroxide is about 30% to about 35% by weight, with a most preferred concentration of about 33%.

The zinc powder can generally be made from any battery grade zinc composition. Preferred particle size is about 100 to about 500 microns average, with at least about 90 weight percent of the zinc being within the stated range. The zinc preferably includes a small amount of lead additive, such as about 0.02% to about 0.1% by weight based on the weight of the zinc powder. Preferred amount of lead is about 0.05% by weight, or less Preferably, indium comprises no more than 0.0005% by weight of the zinc.

In the illustrated embodiments, the anode composition includes mercury as a functioning component therein. The amount of mercury can, however, be reduced as compared to conventional alkaline electrochemical cells. While an overall range of about 0.2% to about 12% mercury by weight is contemplated, preferred range for the mercury is about 1% to about 4%. A most preferred range is about 2% to about 3.5% mercury. Preferred zinc powder is amalgamated such that the surface of the zinc bears an equivalent proportion of the mercury content to that of the bulk.

While the precise mechanism is not well understood, and while applicants choose to not be bound by technical theory here, applicants believe that the mercury, in the presence of the indium and the organic surfactant, facilitates an increased electrochemical reaction rate capacity in the anode, thus releasing electrons from the zinc at an increased electrochemical reaction rate.

The method of associating the mercury with the zinc is not critical. Thus, the mercury may be associated with the zinc as by physically mixing mercury with the zinc particles, by alloying mercury with zinc, by solution displacement reaction, and the like.

The zinc powder alloy is preferably free from functionally detectable amounts of indium. To the extent the zinc powder may comprise indium as an alloy component therein, the amount of indium alloyed with the zinc is generally less than 0.01% by weight, based on the weight of the zinc.

Just as it is important to provide chemically for a rapid electrochemical reaction rate in the anode material, it is equally important to provide adequate oxygen at the reaction surface 90 of the cathode assembly as defined inwardly of the foot 64 of seal 60. Accordingly, the bottom 46 of the cathode can has a plurality of the air ports 54. A size PR44 cell preferably includes at least 4 air ports 54, with 5 air ports being an improvement, and 6 air ports 54 being preferred. The air ports should be evenly distributed over the face of the bottom 46 opposite the active reaction surface 90 of the cathode assembly, in order to efficiently distribute oxygen over the entire face of the reaction surface 90.

Further, the size of the combined open area defined by the air ports, and thus providing avenues for ingress of air into the cathode, is important to the proper functioning of the cell 10. The combined open area represents that area enclosed by the perimeters of the air ports 54. The area may be distributed over greater than the 6 air ports suggested.

To the extent the number of air ports is increased, the minimum open area should still in general be maintained in order to provide adequate oxygen to drive the rapid reaction rate required to meet the load demands of the cell as expressed herein.

All that said, in a PR44 size cell, which can have an enclosed cell volume of up to about 0.04 cubic inch, the open area of all the air ports combined should be at least 0.00047 square inch, and preferably no more than about 0.00189 square inch. Preferred open area is no more than about 0.001 square inch. Accordingly, in a size PR44 cell, having 6 air ports 54, each air port preferably has a diameter of about 0.015 inch, with a range of about 0.010 inch to about 0.020 inch.

To the extent the combined open area is less than the disclosed amount, or relative amount, output rate is reduced because of a shortage of oxygen reaching the cathode reaction surface. To the extent the combined open area is greater than the disclosed amount, or a relative amount, the cathode is so open to ambient air that the cell may dry out, and become prematurely non-functional, from excess evaporation of electrolyte through the air ports 54.

In general, then, this invention addresses the materials and structures which affect the high drain capacities of the cell, along with the degree of efficiency with which the cell 10 fills the space 12 with electrochemically reactive material. Accordingly, the invention addresses materials, structures, and methods for improving especially the rate at which the cells produce electrochemical power, along with the efficiency with which the design of the cell 10 fills the space 12 with electrochemically reactive material.

To the extent feasible within other constraints on making and using the cell, the cell should have a flat top and a flat bottom. The side wall 47 should meet the bottom 46 at a generally perpendicular angle. The top corner of the cell, adjacent the top 66 of the seal 62 should be as close as possible to the corresponding upper corner of the space 12.

Having thus described conceptually the desire to efficiently fill as much as possible of the space 12 with the cell 10, the methods of so filling the space, and of enhancing the fraction of the volume of the cell 10 which is occupied by electrochemically reactive material, are discussed following.

THE SEAL

Seal 60 performs at least two primary functions. First, the seal serves as a closure for the cell, to prevent anode material and/or electrolyte from leaking from the cell between the outer surface 34 of the side wall 30 of the anode can and the inner surface 56 of the side wall 47 of the cathode can. Thus, the seal must possess adequate liquid sealing properties to prevent such leakage. Generally, such properties are available in a variety of resiliently deformable thermoplastic polymeric materials.

Second, the seal provides electrical insulation, preventing all effective direct electrical contact between the anode can 24 and the cathode can 44. Accordingly, the side wall 62 of the seal must circumscribe, and provide electrical insulation properties about, the entirety of the circumference of the cell between outer surface 34 and inner surface 56, generally from the top of side wall 47 to the bottom of side wall 30. Similarly, the foot 64 of the seal must circumscribe, and provide electrical insulation properties about, the entirety of the circumference of the cell between foot 36 of side wall 30, the lower portion of side wall 47, and the outer perimeter portion of the cathode assembly 42. The combination of good liquid sealing properties and good electrical insulation properties is typically achieved by molding known battery-grade nylon polymeric material in the desired configuration.

To meet the electrical insulation requirements, the seal must have good dielectric insulation properties, must have a minimum thickness about side wall 62, and must be free of any pinholes or other imperfections that might permit transmission of electric current between side walls 30 and 47. Thickness for seal side wall 62 of about 0.200 to about 0.250 millimeter is common in conventional electrochemical cells. Thickness as thin as 0.100 millimeter is acceptable for cells of the invention, using the same resiliently deformable thermoplastic nylon material as the thicker seals of the conventional art.

Depending on the structure of the cell to which the seal is to be applied, intermediate thicknesses such as e.g. 0.150 millimeter, 0.140 millimeter, 0.127 millimeter, or the like, may be selected for some cells. However, where cell volume efficiency is a driving consideration, preferred thicknesses are less, for example 0.120 millimeter or 0.110 millimeter to as thin as 0.100 millimeter. Thus, the range of thicknesses for seals 60 preferred for use in cells 10 of the invention has a lower end of about 0.100 millimeter. Suitable such nylon seals are available from Suratco Products Company, Poynette, Wis. USA.

THE CATHODE ASSEMBLY

The cathode assembly 42 is best seen in FIG. 1. An active layer 72 of the cathode assembly is interposed between barrier layer 74 and air diffusion layer 57. Active layer 72 ranges preferably between about 0.050 millimeter and about 1.25 millimeter thick, and facilitates the reaction between the hydroxyl in the electrolyte and the cathodic oxygen of the air. Barrier layer 74 is a micro-porous plastic membrane about 0.025 millimeter thick, typically polypropylene, having the primary function of preventing anodic zinc particles from coming into physical contact with the remaining elements of the cathode assembly 42. Barrier layer 74 however, does permit passage of hydroxyl ions and water therethrough to the cathode assembly.

Air diffusion layer 57 is preferably a micro-porous hydrophobic polymeric material such as a polytetrafluoroethylene (PTFE) membrane about 0.025 to about 0.050 millimeter thick, which permits passage of air therethrough and which is generally impervious to battery electrolyte. The air diffusion layer 57, in combination with the air ports 54, are used to efficiently transport oxygen to the active reaction surface area of the cathode assembly.

Active layer 72 is further comprised of connecting substratum, namely a conductive woven nickel wire layer (not shown), capable of interfacing, as a current collector, with the cathode can. Carbon preferably forms a matrix surrounding the conductive layer of nickel wire. Nickel is preferred for the conductive layer because nickel exhibits little or no corrosion in the alkaline environment of the zinc-air cell, and also because nickel is an excellent electrical conductor.

The thickness of the cathode assembly between the barrier layer 74 and the diffusion layer 57 should desirably be as small as possible. A cathode assembly preferred for use in electrochemical cells of the invention can be made as follows. Place e.g. 1000 milliliters of distilled water in a container, and add 19 grams of $KMnO_4$ thereto. Mix this solution for ten minutes. Then slowly add 204 grams of PWA activated carbon having the appropriate particle sizes to the central mix vortex.

PWA activated carbon has the following characteristics: surface area between about 1000 and 1,150 $m^2$/g., apparent density of about 0.51 g/cc., real density of about 2.1 g/cc., pore volume of about 0.90 g/cc., specific heat at 100 degrees C. of about 0.25, and about 65% by weight to about 75% by weight of such material will pass through a wet −325 U.S. mesh screen.

After 10 minutes of mixing, slowly and uniformly, and without interruption, add 51 grams of Teflon® T-30 dispersant to the edge of the mix vortex, and continue mixing for yet another ten minutes at the speed required to maintain a vortex in the mix after the Teflon dispersant is added. Filter the resulting solution through Whatman #1 or equivalent filter paper, and heat to between 100 degrees C. and 140 degrees C., in a mechanical convection drying oven for at least 16 hours, or until dry, to yield a suitable cake of cathode material.

Combine the resulting cathode material with about 4% carbon black and mix for 30 minutes, or until the mix becomes free flowing. Roll the resulting cathode mix between conventional stainless steel roller mills to obtain the active layer 72. Further details for making such preferred cathode assemblies 42 for use in cells 10 of the invention, including methods for incorporating the conductive layer of nickel wire into the cathode assembly, are disclosed in U.S. Pat. No. 5,308,711, herein incorporated by reference.

THE CATHODE CAN

Cathode 40 is generally comprised of the cathode assembly 42, contained within cathode can 44. Referring to FIG. 1, the side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. In preferred embodiments of the invention, the inner surfaces 48 and 56 come together at a sharp corner, such that the inner surface of the intermediate element is of nominal dimension. To the extent the corner material is worked in forming the corner, the corner is work hardened, whereby the corner structure is strengthened with respect to bottom 46 and side wall 47 as the corner structure is formed at intermediate element 80.

Whereas in conventional cathode cans, the inner surface of the intermediate element describes a radius of e.g. 0.127 mm, the inner surface of cathode cans preferred for use in the invention describe a radius of less than 0.125 mm. A radius of 0.075 mm or less is an improvement over conventional cathode cans. A radius of 0.050 mm is good, with 0.025 mm being even better. Preferably the coming together of the inner surfaces 48 and 56 describes a sharp interior corner, whereupon the representation of intermediate section 80 is nominal at the inner surface of the respective corner. A "sharp interior corner," means that the radius is substantially zero, or as close to zero as can be made with standard machine tools.

In addition to the improvement in the structure of the cathode can which can be obtained from the novel corner structure at intermediate element 80 described above, the ability to reduce the thickness of the cathode can between its inner and outer surfaces, whether at side wall 47 or at bottom 46, is further improved by making the cathode can from a modified metal strip material. For making conventional button-type cells, it is known to use a three-layer metal strip, including a core layer of AISI 1008, Aluminum Killed, Battery Grade cold rolled steel, plated on opposing surfaces with layers of nickel, each of the plated layers being about 0.00165 mm to about 0.00215 mm thick. The plated three-layer structure is diffusion annealed such that the nickel layers are diffusion bonded to the core layer. The diffusion annealed three-layer strip is then temper rolled to specified thickness. However, conventionally-known such three layer structures have limited ability to withstand the closing forces imposed by the closing die in closing the cells, as the thickness of the three-layer metal strip is reduced. The thickness of the metal strip can be further reduced where the physical properties of the metal strip are modified. Table 1 sets forth comparable properties for a metal strip used for cells of the invention, as Invention Example #1, and Comparative Example #1 for a conventional metal strip.

As referred to in TABLE 1, and elsewhere herein, the nomenclature used for the Temper of the metal strip is adapted from the Special Temper designation suggested by supplier, Thomas Steel Strip Corporation, Warren, Ohio, from whom the metal strip used in the invention can be obtained. Accordingly, the Temper designations "Temper 4" for the Comparative Prior Art Strip, and "Temper 3.5" for the metal strip used in cathode cans used in the invention represent the combination of physical properties illustrated in TABLE 1. In the temper designation system incorporated into TABLE 1, a lower Temper number generally represents a harder, less ductile material, while a higher Temper number generally represents a softer, more ductile material.

TABLE 1

| Property | Inv. Ex #1 | C Ex 1 |
| --- | --- | --- |
| Temper Number | 3.5 | 4 |
| Grain Size, ASTM E112-88 | 7–12 | 9–12 |
| Yield Strength | 45–52 ksi | 32–45 ksi |
| Elongation, Min, 80–100 mm width | 25% | 35% |
| Hardness | 76–82 | 77–82 |
| Erichsen Ductility ASTM E643-84 | p7.5 mm | p9.5 mm |

As seen from the properties illustrated in TABLE 1, metal strip used for cathode cans used in cells of the invention has a higher yield strength, less elongation, and is less ductile than conventional metal strips of e.g. Comparative Example 1. Grain size is also reduced to a degree.

The physical properties in TABLE 1 suggest that the metal strip is harder and less formable than conventional battery grade metal strip. Yet battery-forming experiments by the inventors herein show that the modified metal strip is suitable for making batteries using the methods disclosed herein.

The above structural improvements in the corner of the electrode can can be practiced using a variety of metal structures. Strength and ductility are the important physical characteristics of the electrode can. Cathode cans with the improved corner structure may be formed of virtually any metal that is plated or clad with the appropriate metal, such appropriate metal having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

The cathode can may be formed entirely of a metal or alloy having a hydrogen overvoltage similar to that of the electrode (as opposed to plating or cladding the can) so long as sufficient strength and ductility are available from the material selected. In addition to nickel, stainless steel, palladium, silver, platinum, and gold may be suitable plating, cladding, or can materials. Steel strip plated with nickel and nickel alloy is generally used because of cost considerations, and because pre-plated steel strip, which generally requires no post-plating processes, is commercially available. The metal in the can must be both ductile enough to withstand the drawing process and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other examples of materials for cathode cans include nickel-clad stainless steel; nickel-plated stainless steel; INCONEL (a non-magnetic alloy of nickel); pure nickel with minor alloying elements (NICKEL 200 and related family of NICKEL 200 alloys such as NICKEL 201, etc.), all available from Huntington Alloys, a division of INCO, Huntington, W. Va. Some noble metals may also find use as plating, cladding, or can metals, including steel strip plated with nickel, and mild steel strip subsequently plated with nickel after forming the can.

In order to obtain the advantages of the Temper 3.5 metal strip, one must, of course, select appropriate materials and utilize proper metal processing steps, as illustrated above, to obtain the balance of properties of hardness and ductility which provide sufficient strength for the thinner can wall while tolerating the forming steps wherein the can is formed from the metal strip, and wherein the cathode can is crimped about the seal 60 and the anode can 24. Given the above teaching of Temper and related properties, those skilled in the art can now apply the principles taught herein to a variety of the above related metals and structures.

THE ANODE CAN

The process described above for forming cathode cans from metal strip is also useful for making anode cans having related improvements in physical properties. Such making of anode cans is, of course, practiced using metal structures compatible with the polarity of the anode.

For example, an anode can is preferably plated with copper on its inner surface. Copper has a hydrogen overvoltage similar to that of zinc. An anode can is readily formed of stainless steel wherein the inner surface 32 can be plated with copper, and the outer surface 34 plated with nickel. Typical anode cans comprise a metal strip having a three-layer structure including a core layer of e.g. 304 stainless steel, plated on opposing surfaces with outer layers of copper and nickel, respectively.

As with other aspects of this invention, the thickness of the metal strip used to form the anode can is desirably reduced to a value less than thicknesses for conventionally known such elements.

In conventional metal strip material used to make anode cans, about 76 percent by weight of the metal is contained in the core layer of stainless steel, about 16 percent by weight is contained in the inner copper layer, and about 8 percent by weight is contained in the outer nickel layer. Accordingly, with all expressions being percent by weight represented by the respective layer, the conventional structure can be expressed, layer for layer, as /16% Cu/76% SS/8% Ni/.

"Cu" is copper. "SS" is stainless steel. "Ni" is nickel. All expressions are percent by weight.

The strength of the above metal strip structure is provided by a combination of (a) thickness of the structure, and (b) the combined strengths of the materials in the individual layers. Regarding materials, the stainless steel provides proportionately more strength than the copper or the nickel. The fraction of the metal strip comprising the stainless steel layer can be increased, thus providing greater strength per unit of thickness, while maintaining suitable forming properties for forming anode cans having reduced overall thickness of the three-layer metal strip. A three-layer structure of the above nature, having the combination of suitable forming properties along with sufficient strength, stiffness, and crush resistance in the anode can, can be made into anode cans when the relative amounts of the layers are revised to increase the relative amount of the stainless steel core layer. The following structures illustrate that the amount of stainless steel can be increased by up to about 20% over the conventional structures, from 76% stainless steel to about 91% stainless steel. Exemplary such structures are:

/16% Cu/82% SS/2% Ni/
/7% Cu/91% SS/2% Ni/

The above two structures of metal strip, for making anode cans for use in the invention, are merely illustrative of the full range of structures that can be made wherein the common feature is the increase in the amount of stainless steel relative to the amount of copper and/or nickel. Accordingly, the weight of the copper layer can range from about 7% to about 16% of the weight of the three-layer metal strip, and the weight of the nickel layer can range from about 2% to about 7% by weight of the three-layer metal strip. So long as the stainless steel content is increased above the conventionally known level of about 76%, the strength of the metal strip, for any given thickness, is improved. Thus, the metal strip allows for reduction in thickness while maintaining the strength of the anode can.

Preferred steps in the development of structures having increasing amounts of the stainless steel layer, and thus higher strength/thickness ratio, produce anode cans having progressively, 77% stainless steel, 80% stainless steel, 83% stainless steel, 87% stainless steel, and 91% stainless steel, with corresponding 20%, 17%, 13%, and 9% as the respective amounts, combined, of the copper and nickel layers. Preferred steps in development of structures for the metal strip having decreasing amounts of the copper layer are 15% copper, 11% copper, and 7% copper. Preferred steps in development of structures having decreasing amounts of the nickel layer are 7% nickel, 6% nickel, 3% nickel, and 2% nickel. The full range of the structures specified herein can be obtained from Sumitomo Metals Company, Japan.

VOLUME EFFICIENCIES

Volume efficiencies of cells of the invention are obtained as a result of the combination of numerous reductions in space usage for various of the non-reactive elements of the cell, primarily structural elements inside the cell related to the second portion of the space 12. Thus, thicknesses have been reduced at least in one or more, preferably all of the following: anode can 24, cathode can 44, cathode assembly 42, and seal 60.

EXAMPLES

The following examples, in combination with respective ones of the drawings, illustrate the high rate capacities of electrochemical cells of the invention. Size PR44 cells were made using the anode materials and processes for making anode compositions, as described above. The ratio of zinc to potassium hydroxide was 2/1. Lead content in the zinc was 0.05%. 0.1% indium in the form of indium hydroxide, based on the weight of the zinc, was added to the zinc composition. Mercury content was 3% by weight based on the zinc. Surfactant was the above described Natrosol®, at 0.33% by weight based on the zinc. The cathode can included 6 air ports, each 0.015 inch diameter, evenly distributed over the bottom of the can opposite the reaction surface 90 of the cathode assembly.

The cells so made were subjected to three tests, as follows. Representative conventional zinc-air cells, size PR44, as well as silver and mercury cells, were similarly tested for comparison against cells of the invention under the test conditions used. Since the cells as fabricated for this example represent cells intended to be used to power hearing aids, the end point of the test was selected as 1.1 volts, the minimum voltage required for reliable operation of modern hearing aids.

In the first test, the cells were subjected to a continuous drain test. In the continuous drain test, the cells were continuously discharged under a continuous electrical load of 51 ohms.

Figure 4:
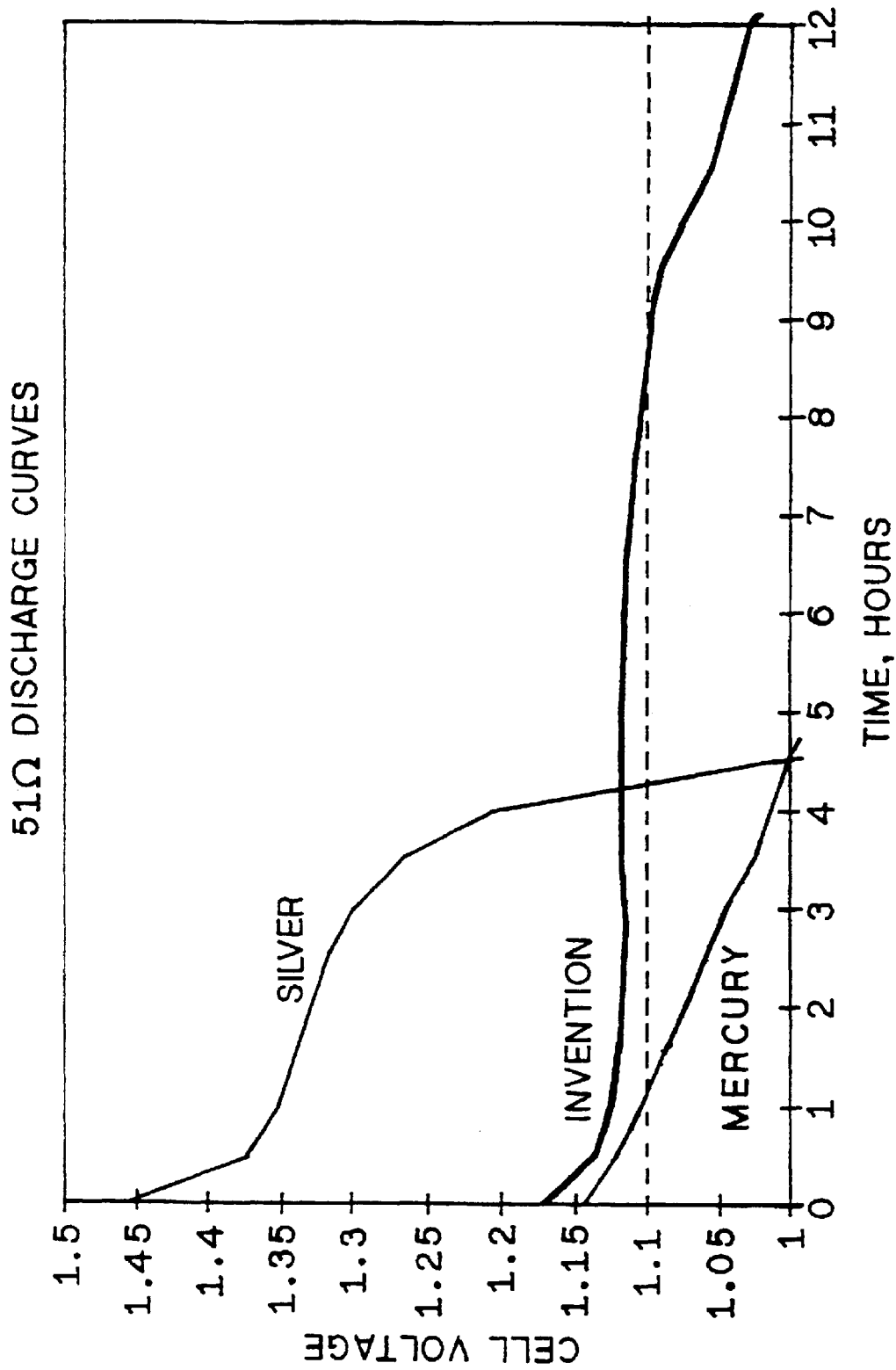
FIGS. 4 and 5 show graphs of closed circuit voltage with respect to time, under continuous drain conditions, of electrochemical cells of the invention, and of conventional cells.
Figure 5:
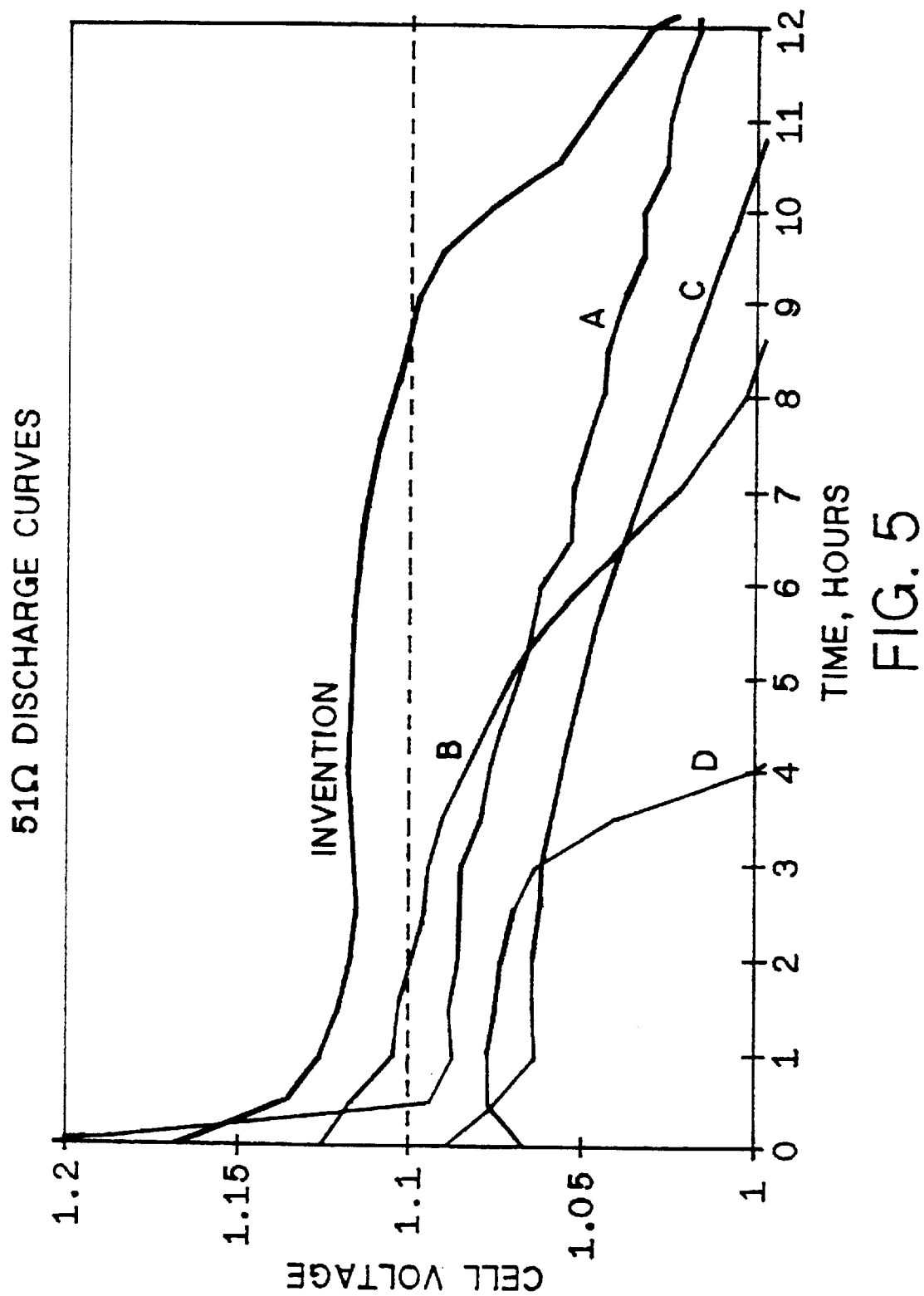
Figure 6:
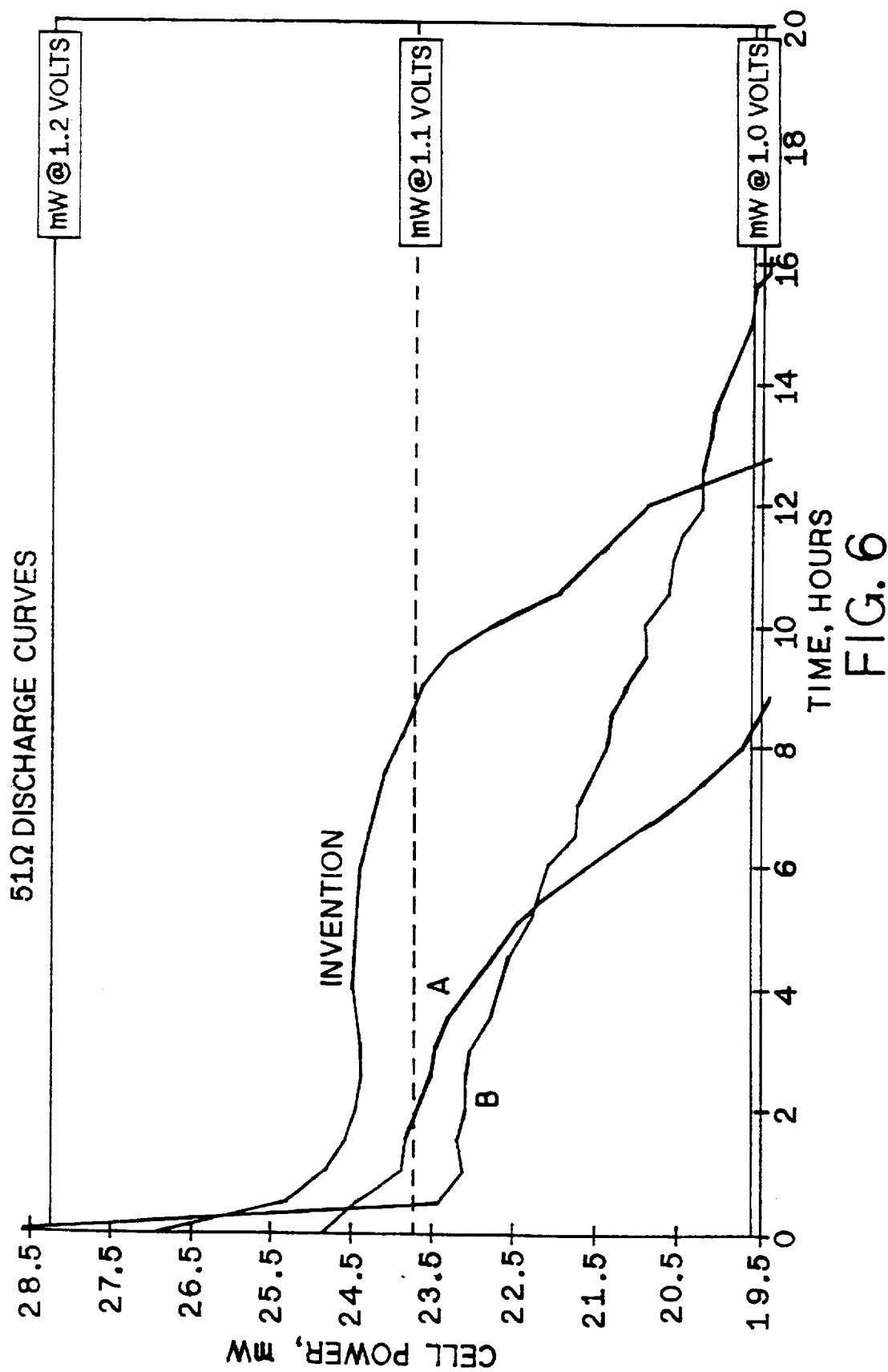
FIG. 6 shows power output, overlaid with voltage, of some of the cells illustrated in FIGS. 4 and 5.

FIGS. 4–6 show the results of the first test. Among the conventional cells, the silver cell remained active above the end point the longest, operating successfully for about 4.5 hours. The mercury cell reached its endpoint in about 1 hour with a steadily declining voltage. Cells "C" and "D" never reached the required 1.1 volts. Cell "A" reached the endpoint in less than 1 hour, with steadily declining voltage.

Cell "B" reached the endpoint in about 2 hours, with an increasing rate of decline in voltage after about 5 hours. Cells of the invention, by contrast, operated for about 9 hours at a relatively constant voltage before reaching the end point voltage of 1.1 volts and beginning a steadily increasing decline in voltage.

FIG. 6 shows the power output of cells of the invention in the first test compared to conventional cells "A" and "B." As seen in FIG. 6, the "A" and "B" cells both exhibited steadily declining rates of both voltage and power under this rather heavy electrical loading of the cells. By contrast, cells of the invention produced electric power at a relatively steady rate of both power output and voltage for over 8 hours, producing at least 23.5 milliwatts, corresponding with at least 1.1 volts, for over 8 hours, and producing at least 23 milliwatts for about 10 hours.

In the cells so made and tested, the size of the area defined by the reaction surface 90 of the cathode assembly, as exposed to oxygen inside the air reservoir 55, was 0.10866 square inch (0.701 square centimeter). Thus, the power density of the cell at 23 milliwatts was about 210 milliwatts per square inch of reaction surface area on the cathode assembly.

In the second test, the cells were subjected to pulse test loading. Each cell was discharged at a load of 37 ohms for 1 second, followed by a load of 370 ohms for 1 second, with the sequence being continuously repeated until the cell reached the endpoint of 1.1 volts.

Figure 7:
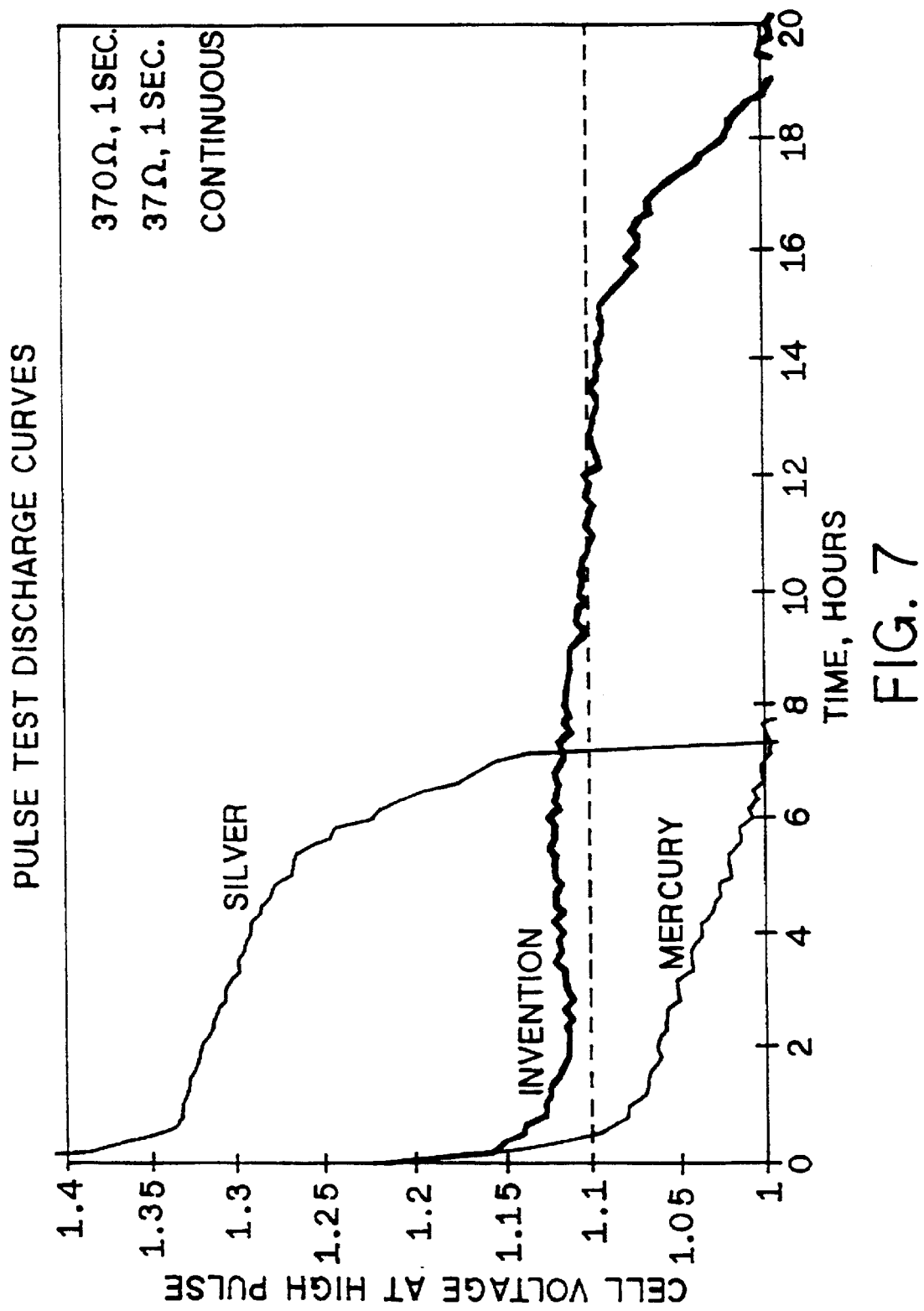
FIGS. 7 and 8 show graphs of closed circuit voltage with respect to time, under continuous pulse discharge conditions, of electrochemical cells of the invention, and of conventional cells.
Figure 8:
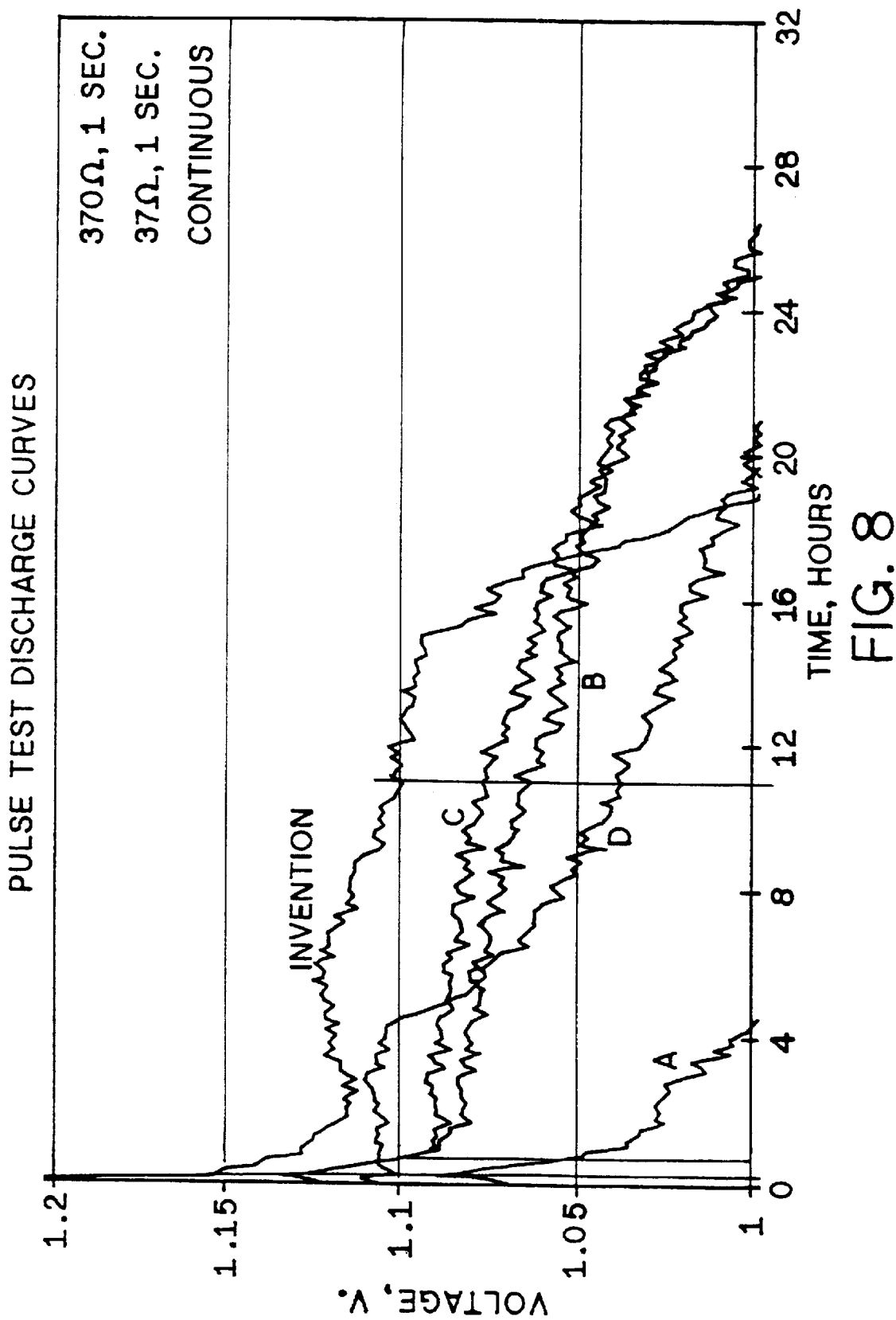

FIGS. 7–8 show the results of the second test. As seen in FIG. 7, the mercury cell reached the endpoint in less than an hour under constantly declining voltage. The silver cell reached the endpoint in less than 8 hours. FIG. 8 shows that cell "A" failed almost immediately, with a rapidly declining voltage. Cells "B" and "C" reached their endpoints within an hour, and then experienced steady further declines in voltage. Cell "D" reached its endpoint within 4 hours, and then went into a relatively rapid decline in voltage. Cells of the invention, on the other hand, functioned for over 10 hours, at a relatively constant voltage, before reaching the endpoint, and maintained a relatively steady voltage very close to 1.1 volts until more than 14 hours into the test, before beginning a steady decline in voltage.

In the third test, the cells were subjected to a load of 43 ohms for 1 second, followed by a load of 430 ohms for 59 seconds, and the sequence was repeated for 12 hours. At the end of the 12 hours, the cells rested for 12 hours, then the loading sequence was repeated, with 12 hours of loading followed by 12 hours of rest, until the cells reached their endpoints.

Figure 9:
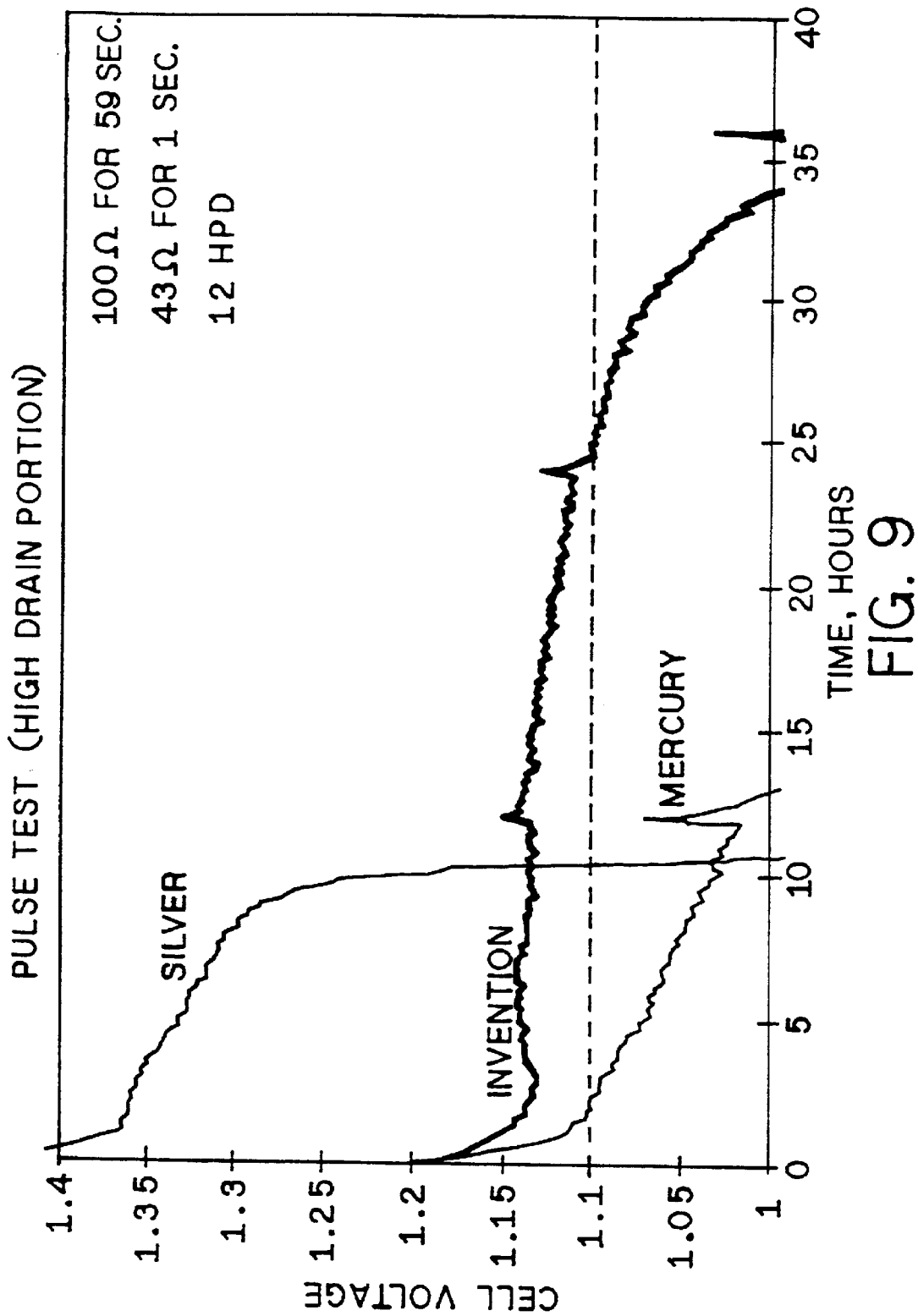
FIGS. 9 and 10 show graphs of closed circuit voltage with respect to time, under pulse discharge conditions with intervening periods of rest, of electrochemical cells of the invention, and of conventional cells.
Figure 10:
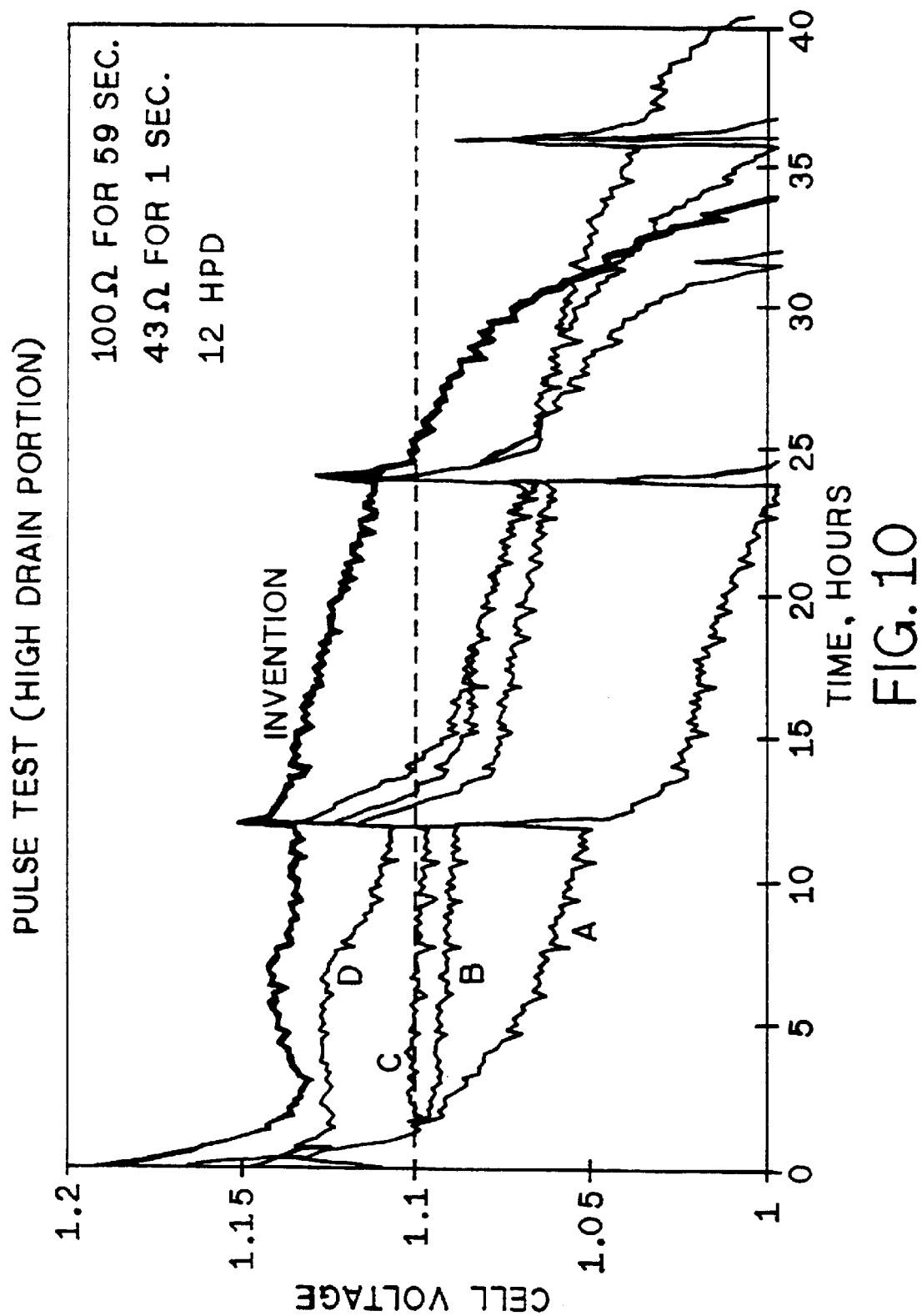

FIGS. 9–10 show the results of the third test. Only the active drain portions of the test are shown. Thus, the rest periods are not shown in FIGS. 9 and 10. All except the silver cell produced short-lived higher voltage after the 12-hour rest periods than immediately before such rest periods. The silver cell experienced a sharp voltage drop-off, and reached its endpoint, about 10 hours into the test. The mercury cell reached its endpoint under steadily declining voltage less than 5 hours into the test. Cell "A" reached its endpoint in less than 3 hours, accompanied by steadily declining voltage. Cells "B" and "C" operated at or near the endpoint for about 13 hours before decidedly dropping below the endpoint of 1.1 volts. Cell "D" operated at a voltage above the endpoint for slightly longer, about 14 hours before falling below the endpoint. Cells of the invention, on the other hand, continued to operate well above the endpoint for a substantially longer time, finally reaching the endpoint about 25 hours into the test.

The above three tests are admittedly demanding drains on cells of the type tested. However, the tests illustrate the superior ability of cells of the invention to maintain relatively consistent voltages under high drain conditions by virtue of the novel anode compositions and cell structures disclosed herein. By contrast, the conventional cells generally exhibited steadily declining voltages while cells of the invention were still producing relatively constant emf, as expressed in voltage, and power as expressed in milliwatts.

While the above tests were carried out on a single size cell, namely the PR44 cell, other sizes of cells would perform relatively the same, compared to conventional cells of the same size, making allowances for known differences in electrochemical output related to the different cell sizes.

It is believed that indium compound in the anode composition, separate from any indium alloyed in the zinc, provides a trigger mechanism enabling sufficient reaction rate in the anode composition to sustain a relatively constant voltage at the high drains illustrated in FIGS. 4–10. The steadily declining voltage of conventional cells, on the other hand, suggests that the reaction rate of the electrochemical reactions in such cells is insufficient to maintain a constant voltage at these high drain rates.

While the preferred embodiments have been described with respect to using indium hydroxide as the indium compound, indium chloride and indium sulfate are also contemplated to work as well, and so are within the scope of the invention. Applicants further contemplate that indium bromide, indium oxide, and indium sulfide may work in place of the disclosed indium hydroxide.

Additional metal compounds contemplated to work, in addition to or in place of the indium compound, are compounds of cadmium, gallium, thallium, germanium, tin, and lead. Respectively, such compounds as $CdO$, $Ga_2O_3$, $Th_2O_3$, $GeO_2$, $SnO$, and $PbO$ are contemplated.

This invention has been described with specific reference to rather small zinc-air electrochemical cells, such as are used to power hearing aids and like small appliances. The invention can, however, be applied to a wide variety of alkaline electrochemical cells which use zinc as the primary reaction material to be oxidized in the anode. Accordingly, while the zinc-air cell is described in detail, other cell structures, and especially cathode configurations and chemical systems are well within the scope of the invention, both as described above, and as claimed in the following claims. Such cathode configurations and chemical systems are exemplified by, for example, in addition to the air cathode, cathode compositions based generally on materials such as $MnO_2$, $AgO$, and $Ag_2O$.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An anode for use in a metal air electrochemical cell, said anode comprising:

zinc powder comprised of zinc powder particles; and a reaction rate enabling metal compound comprising a functionally effective amount of a compound of a metal selected from a group consisting of indium, gallium, germanium, tin, and aqueous potassium hydroxide.

2. The anode according to claim 1, further comprising:
from about 55% to about 73% by weight of said zinc powder particles of said zinc powder;
from about 27% to about 45% by weight of aqueous potassium hydroxide; and
from about 0.02% to about 0.5% by weight of said reaction rate enabling metal compound.

3. The anode according to claim 2, wherein salid aqueous potassium hydroxide comprises about 33% by weight of said anode.

4. The anode according to claim 1, wherein at least about 90% of said zinc powder particles of said zinc powder have a particle size ranging between about $100\mu$ and about $500\mu$.

5. The anode according to claim 1, wherein said reaction rate enabling metal compound is selected from a group consisting of indium chloride, indium bromide, indium hydroxide, indium oxide, indium sulfide, indium sulfate, $Ga_2O_3$, $GeO_2$, and SnO.

6. The anode according to claim 5, wherein said reaction rate enabling metal compound is a compound of indium selected from a group consisting of indium chloride, indium bromide, indium hydroxide, indium oxide, indium sulfide, and indium sulfate.

7. The anode according to claim 1, wherein said compound of indium is indium hydroxide.

8. The anode according to claim 6, wherein an amount of said compound of indium present in said anode is from about 0.02% to about 0.4% by weight, based upon a weight of said zinc powder.

9. The anode according to claim 6, wherein an amount of said compound of indium present in said anode is from about 0.05% to about 0.15% by weight, based upon a weight of said zinc powder.

10. The anode according to claim 6, wherein an amount of said compound of indium present in said anode is from about 0.05% to about 0.10% by weight, based upon a weight of said zinc powder.

11. The anode according to claim 1, wherein said zinc powder is comprised of a portion of said zinc powder particles coated with a coating comprising surfactant, with a balance of said zinc powder particles being substantially uncoated.

12. The anode according to claim 11, wherein said surfactant is present in an amount of from about 0.1% to 0.4% by weight, based upon a weight of said zinc powder.

13. The anode according to claim 12, wherein said surfactant is present in an amount of from about 0.3% to about 0.35% by weight, based upon said weight of said zinc powder.

14. The anode according to claim 11, wherein said surfactant is hydroxethylcellulose.

15. The anode according to claim 11, wherein said coating further comprises from about 0.1% to about 0.4% by weight of gelling agent, based upon a weight of said zinc powder.

16. The anode according to claim 15, wherein said gelling agent is carboxypolymethylene.

17. The anode according to claim 1, further comprising from about 0.2% to about 12% by weight mercury, based upon a weight of said zinc powder.

18. The anode according to claim 17, wherein said mercury is present in an amount of between about 2% and about 3.5% by weight, based upon said weight of said zinc powder.

19. The anode according to claim 1, further comprising from about 0.1% and about 0.4% MgO, based upon a weight of said zinc powder.

20. An anode for use in a metal air electrochemical cell, said anode comprising:

from about 55% to about 73% by weight of zinc powder particles of a zinc powder, at least about 90% of said zinc powder particles having a size between about $100\mu$ and about $500\mu$, a portion of said zinc powder particles being coated with a coating comprising a surfactant and a gelling agent, and a remainder of said zinc powder particles being substantially uncoated:

from about 27% to about 45% by weight of aqueous potassium hydroxide;

from about 0.02% to about 0.5% by weight of a reaction rate enabling metal compound selected from a group consisting of indium chloride, indium bromide, indium hydroxide, indium oxide, indium sulfide, indium sulfate, $Ga_2O_3$, $GeO_2$, and SnO; and from about 2% to about 12% by weight mercury, based upon a weight of said zinc powder.

21. The anode according to claim 20, wherein said surfactant ranges from about 0.1% to about 0.4% by weight of said coating, and said gelling agent ranges from about 0.1% to about 0.4% by weight of said coating, based upon said weight of said zinc powder.

22. The anode according to claim 21, wherein said reaction rate enabling compound is a compound of indium selected from a group consisting of indium chloride, indium bromide, indium hydroxide, indium oxide, indium sulfide, and indium sulfate.

23. The anode according to claim 22, wherein said compound of indium is present in an amount of from about 0.05% to about 0.15% by weight, based upon said weight of said zinc powder.

24. The anode according to claim 22, wherein said compound of indium is present in an amount of from about 0.05% to about 0.15% by weight, based upon said weight of said zinc powder.

25. The anode according to claim 22, wherein said compound of indium is indium hydroxide.

26. The anode according to claim 20, wherein said surfactant is hydroxyethylcellulose present in an amount of between about 0.1% and about 0.4% by weight, based on said weight of said zinc powder.

27. The anode according to claim 20, wherein said surfactant is a hydroxyethylcellulose present in an amount of between about 0.3% and about 0.35% by weight, based on said weight of said zinc powder.

28. An electrochemical cell comprising:

an air cathode; and an anode including zinc powder particles of a zinc powder and a reaction rate enabling metal compound comprising a functionally effective amount of a compound of a metal selected from indium, gallium, germanium, tin, and aqueous potassium hydroxide.

29. The electrochemical cell of claim 28, wherein said anode includes from about 55% to about 73% by weight of said zinc powder particles of said zinc powder, from about 27% to about 45% by weight of aqueous potassium hydroxide, and from about 0.02% to about 0.5% by weight of said reaction rate enabling metal compound.

30. The electrochemical cell according to claim 29, wherein said aqueous potassium hydroxide of said anode comprises about 33% by weight of said anode.

31. The electrochemical cell according to claim 28, wherein at least about 90% of said zinc powder particles of said anode have a particle size ranging between about $100\mu$ and about $500\mu$.

32. The electrochemical cell of claim 28, wherein said reaction rate enabling metal compound of said anode is selected from a group consisting of indium chloride, indium bromide, indium hydroxide, indium oxide, indium sulfide, indium sulfate, $Ga_2O_3$, $GeO_2$, and SnO.

33. The electrochemical cell of claim 32, wherein said reaction rate enabling metal compound of said anode is a compound of indium selected from a group consisting of indium chloride, indium bromide, indium hydroxide, indium oxide, indium sulfide, and indium sulfate.

34. The electrochemical cell of claim 33, wherein said compound of indium of said anode is indium hydroxide.

35. The electrochemical cell according to claim 33, wherein an amount of said compound of indium present in said anode is from about 0.02% to about 0.4% by weight, based upon a weight of said zinc powder.

36. The electrochemical cell according to claim 33, wherein an amount of said compound of indium present in said anode is from about 0.05% to about 0.15% by weight, based upon a weight of said zinc powder.

37. The electrochemical cell according to claim 33, wherein an amount of said compound of indium present in said anode is from about 0.05% to about 0.10% by weight, based upon a weight of said zinc powder.

38. The electrochemical cell according to claim 28, wherein said zinc powder of said anode is comprised of a portion of said zinc powder particles coated with a coating comprising a surfactant, and a balance of said zinc powder particles are substantially uncoated.

39. The electrochemical cell according to claim 38, wherein said surfactant is present in an amount of from about 0.1% to 0.4% by weight, based upon a weight of said zinc powder.

40. The electrochemical cell according to claim 39, wherein said surfactant is present in an amount of from about 0.3% to about 0.35% by weight, based upon said weight of said zinc powder.

41. The electrochemical cell according to claim 38, wherein said surfactant of said anode is hydroxethylcellulose.

42. The electrochemical cell according to claim 38, wherein said coating further comprises from about 0.1% to about 0.4% by weight of gelling agent, based upon a weight of said zinc powder.

43. The electrochemical cell according to claim 42, wherein said gelling agent of aid anode is carboxypolymethylene.

44. The electrochemical cell according to claim 28, wherein said anode further comprises from about 0.2% to about 12% by weight of mercury, based upon a weight of said zinc powder.

45. The electrochemical cell according to claim 44, wherein said mercury is present in said anode in an amount of between about 2% and about 3.5% by weight, base upon said weight of said zinc powder.

46. An electrochemical cell comprising:
an air cathode; and
an anode comprising:
from about 55% to about 73% by weight or zinc powder particles of a zinc powder, at least about 90% of said zinc-powder particles having a size between about 100$\mu$ and about 500$\mu$, a portion of said zinc powder particles being coated with a coating comprising a surfactant and a gelling agent, and a remainder of said zinc powder particles are substantially uncoated;
from about 27% to about 45% by weight of aqueous potassium hydroxide;
from about 0.02% to about 0.5% of a reaction rate enabling metal compound being selected from a group consisting of indium chloride, indium bromide, indium hydroxide, indium oxide, indium sulfide, indium sulfate, $Ga_2O_3$, $GeO_2$, and SnO; and
from about 1.0% to about 4% by weight of mercury, based upon a weight of said zinc powder.

47. The electrochemical cell according to claim 46, wherein said surfactant ranges from about 0.1% to about 0.4% by weight of said coating and said gelling agent ranges from about 0.1% to about 0.4% by weight of said coating, said percentages by weight based upon said weight of said zinc powder.

48. The electrochemical cell according to claim 46, wherein said reaction rate enabling compound is a compound of indium selected from a group consisting of indium bromide, indium chloride, indium hydroxide, indium oxide, indium sulfide, and indium sulfate.

49. The electrochemical cell acccording to claim 48, wherein said compound of indium is indium hydroxide.

50. The electrochemical cell according to claim 48, wherein said compound of indium is present in an amount of from about 0.02% to about 0.5% by weight, based upon said weight of said zinc powder.

51. The electrochemical cell according to claim 48, wherein said compound of indium is present in an amount of from about 0.02% to about 0.15% by weight, based upon said weight of said zinc powder.

52. The electrochemical cell according to claim 48, wherein said compound of indium is present in an amount of from about 0.02% to about 0.10% by weight, based upon said weight of said zinc powder.

53. A metal air electrochemical cell having outer walls defining a contained volume, said metal air electrochemical cell comprising:
an air cathode including a cathode can, and a cathode assembly, said cathode assembly comprising a reaction surface exposed to a cathodic oxygen, said cathode can having a bottom, said bottom of said cathode can comprising at least one air port for said cathodic oxygen to be transferred therethrough to said reaction surface;
an anode comprising an anode material and a container therefor, said anode material comprising:
from about 55% to about 73% by weight of zinc powder particles of a zinc powder at least about 90% of said zinc powder particles having a size between about 100$\mu$ and about 500$\mu$, a portion of said zinc powder particles of said zinc powder being coated with a coating comprising a surfactant and a gelling agent, a remainder of said zinc powder particles of said zinc powder being substantially uncoated;
from about 27% to about 45% by weight of an aqueous potassium hydroxide;
from about 0.02% to about 0.5% of a reaction rate enabling metal compound selected from a group consisting of indium chloride, indium bromide, indium hydroxide, indium oxide, indium sulfide, indium sulfate, $Ga_2O_3$, $GeO_2$, and SnO; and
from about 2% to about 3.5% by weight of mercury, based upon a weight of said zinc powder.

54. The metal air electrochemical cell according to claim 53, wherein said reaction rate enabling compound is a compound of indium selected from a group consisting of indium bromide, indium chloride, indium hydroxide, indium oxide, indium sulfide, and indium sulfate.

55. The metal air electrochemical cell according to claim 53, wherein said compound of indium is indium hydroxide.

56. The metal air electrochemical cell according to claim 55, wherein said indium hydroxide is present in said cathode material in an amount of from about 0.02% to about 0.5% by weight, based upon said weight of said zinc powder.

57. The metal air electrochemical cell according to claim 55, wherein said indium hydroxide is present in said cathode material in an amount of from about 0.05% to about 0.15% by weight, based upon said weight of said zinc powder.

58. The metal air electrochemical cell according to claim 55, wherein said indium hydroxide is present in said cathode material in an amount of from about 0.05% to about 0.10% by weight, based upon said weight of said zinc powder.

59. The metal air electrochemical cell according to claim 53, wherein said surfactant of said coating is comprised of a hydroxyethylcellulose in an amount of from about 0.1% to about 0.4% by weight, based upon said weight of said zinc powder, and wherein said gelling agent of said coating if comprised of a carboxypoly-methylene in an amount from about 0.1% to about 0.5% by weight, based on a weight of said aqueous potassium hydroxide.

60. The metal air electrochemical cell according to claim 53, wherein said at least one air port has a total open area of less than about 0.0019 square inch.

61. The metal air electrochemical cell according to claim 53, wherein said bottom of said cathode can comprising at least one air port includes five air ports, said five air ports having a combined open area of front about 0.00047 square inch to about 0.0019 square inch.

62. The metal air electrochemical cell according to claim 53, wherein said bottom of said cathode can comprising at least one air port includes six air ports, said six air ports having a combined open area of from about 0.00047 square inch to about 0.0019 square inch.

63. The metal air electrochemical cell according to claim 61, wherein said five air ports are evenly distributed on said bottom of said cathode can.

64. The metal air electrochemical cell according to claim 62, wherein said six air ports are evenly distributed on said bottom of said cathode can.

65. A metal air electrochemical cell having outer walls defining a contained volume, said metal air electrochemical cell comprising:
an air cathode including a cathode can and a cathode assembly, said cathode assembly comprising a reaction surface exposed to a cathodic oxygen, said cathode can having a bottom, said bottom of said cathode can comprising at least one air port for said cathodic oxygen to traverse therethrough to said reaction surface;
an anode comprising an anode material and a container therefor, said anode material comprising:
from about 55% to about 73% by weight of zinc powder particles of a zinc powder, at least about 90% of said zinc powder particles of said zinc powder having a size between about 100$\mu$ and about 500$\mu$, a portion of said zinc powder particles of said zinc powder being coated with a coating comprising a surfactant and a gelling agent, and a remainder of said zinc powder particles of said zinc powder being substantially uncoated;
from about 27% to about 45% by weight of an aqueous potassium hydroxide comprising about 2% of a ZnO, based upon a weight of said aqueous potassium hydroxide;
from about 0.02% to about 0.5% by weight of indium hydroxide; and
from about 2% to about 3.5% by weight of a mercury, based upon a weight of said zinc powder;
wherein said metal air electrochemical cell has a capacity to deliver a watt density of at least 210 milliwatts per square inch of an area of said reaction surfacer under a load of 51 ohms at continuous discharge for at least about five hours.

66. The metal air electrochemical cell according to claim 65, further comprising a contained volume of about 0.04 cubic inch having a capacity to sustain an emf of at least about 1.1 volts under a load of 51 ohms at continuous discharge for a period of at least eight hours.

67. A metal air electrochemical cell having outer walls defining a contained volume comprising:
an air cathode including a cathode can and a cathode assemnbly, said cathode assembly comprising a reaction surface exposed to a cathodic oxygen, said cathode can having a bottom, said bottom of said cathode can comprising at least one air port for said cathodic oxygen to traverse therethrough to said reaction surface;
an anode comprising an anode material and a container therefor, said anode material comprising:
about 67% by weight of zinc powder particles of a zinc powder, at least about 90% of said zinc powder particles of said zinc powder having a size between about 100$\mu$ and about 500$\mu$, a portion of said zinc powder particles of said zinc powder being coated with a coating comprising from about 0.1% to about 0.4% by weight of a surfactant, based upon a weight of said zinc powder, from about 0.1% to about 0.4% by weight of a gelling agent, based upon said weight of said zinc powder, and a remainder of said zinc powder particles of said zinc powder being substantially uncoated;
about 33% by weight of an aqueous potassium hydroxide;
from about 0.02% to about 0.5% of an indium hydroxide; and
from about 2% to about 3.5% by weight of a mercury, based upon said weight of said zinc powder;
wherein said metal air electrochemical cell has a capacity to deliver a watt density of at least 210 milliwatts per square inch of an area of said reaction surface under a load of 51 ohms at continuous discharge for at least about five hours.

68. The metal air electrochemnical cell according to claim 67, further comprising a contained volume of about 0.04 cubic inch having a capacity to sustain an emf of at least about 1.1 volts under a load of 51 ohms at continuous discharge for a period of at least eight hours.

* * * * *